United States Patent
Cutler et al.

(10) Patent No.: US 9,970,545 B2
(45) Date of Patent: May 15, 2018

(54) STERN TUBE SEAL SYSTEM

(71) Applicant: Mide Technology Corporation, Medford, MA (US)

(72) Inventors: Andrew Cutler, Seattle, WA (US); Stephen Hanly, Charlestown, MA (US); Steven A. Klepper, Stoneham, MA (US); Christopher Ludlow, Melrose, MA (US); Mark Spadafora, Arlington, MA (US); Marthinus van Schoor, Arlington, MA (US)

(73) Assignee: Mide Technology Corporation, Medford, MA (US)

( * ) Notice: Subject to any disclaimer, the term of this patent is extended or adjusted under 35 U.S.C. 154(b) by 0 days. days.

(21) Appl. No.: 15/422,892

(22) Filed: Feb. 2, 2017

(65) Prior Publication Data
US 2017/0138477 A1 May 18, 2017

Related U.S. Application Data

(63) Continuation of application No. 14/689,580, filed on Apr. 17, 2015, now abandoned.

(51) Int. Cl.
| | |
|---|---|
| *F16J 15/34* | (2006.01) |
| *F16J 15/00* | (2006.01) |
| *F16J 15/3204* | (2016.01) |
| *F16J 15/54* | (2006.01) |
| *B63H 23/32* | (2006.01) |

(52) U.S. Cl.
CPC .......... *F16J 15/008* (2013.01); *B63H 23/321* (2013.01); *F16J 15/3204* (2013.01); *F16J 15/3452* (2013.01); *F16J 15/3496* (2013.01); *F16J 15/54* (2013.01); *B63H 2023/327* (2013.01)

(58) Field of Classification Search
CPC .... F16J 15/008; F16J 15/3204; F16J 15/3452; F16J 15/3496; F16J 15/54; B63H 23/321; B63H 2033/327
USPC ......................................................... 277/306
See application file for complete search history.

(56) References Cited

U.S. PATENT DOCUMENTS

| | | | | |
|---|---|---|---|---|
| 2,122,378 | A * | 6/1938 | McCormack | ............ F16J 15/38 277/390 |
| 3,403,916 | A | 10/1968 | Durham et al. | |
| 4,077,634 | A * | 3/1978 | Durham | ................. F16J 15/344 277/382 |
| 4,299,398 | A * | 11/1981 | Wahl | ...................... E21B 4/003 277/336 |
| 4,741,561 | A | 5/1988 | Morita et al. | |

(Continued)

FOREIGN PATENT DOCUMENTS

EP 0656385 A1 6/1995

OTHER PUBLICATIONS

Clamp—definition of clamp by Merriam-Webster (one (1) page).

*Primary Examiner* — Nathan Cumar
(74) *Attorney, Agent, or Firm* — Iandiorio Teska & Coleman, LLP

(57) ABSTRACT

A seal system includes a face seal rotor ring including a wide sealing face preferably made of tungsten carbide. The stator ring includes a narrower sealing face confronting the rotor ring wide sealing face. The stator ring sealing face is preferably made of polyamide-imide and tapers to narrower widths rearwardly.

9 Claims, 11 Drawing Sheets

(56) References Cited

U.S. PATENT DOCUMENTS

| | | | | |
|---|---|---|---|---|
| 5,454,572 | A | * | 10/1995 | Pospisil ............... F16J 15/3412 277/368 |
| 5,571,268 | A | * | 11/1996 | Azibert ................ F16J 15/3488 277/370 |
| 7,828,299 | B2 | | 11/2010 | Van Schoor et al. |
| 2002/0047240 | A1 | * | 4/2002 | Radosav .............. F16J 15/3452 277/389 |
| 2008/0303218 | A1 | * | 12/2008 | van Schoor ............ F16J 15/164 277/304 |

* cited by examiner

STERN TUBE SEAL SYSTEM

RELATED APPLICATIONS

This application is a continuation application of U.S. patent application Ser. No. 14/689,580 filed Apr. 17, 2015, which hereby claims the benefit of and priority thereto under 35 U.S.C. §§ 119, 120, 363, 365 and 37 C.F.R. §§ 1.55 and 1.78, and which is incorporated herein by reference.

GOVERNMENT RIGHTS

This invention was made with U.S. Government support under Contract No. N65540-13-005005 awarded by the Navy. The Government may have certain rights in the subject invention.

FIELD OF THE INVENTION

The invention relates to mechanical face seals and, in one particular embodiment, a stem tube face seal system.

BACKGROUND OF THE INVENTION

A stern tube seal seals a propeller shaft with respect to the ship's stern structure. One existing design includes a silicon carbide stator mating with a silicon carbide rotor. Such seals have failed in service as a result of the brittle nature of these materials. Further, some prior art seals do not include any kind of a backup seal subsystem and were difficult to install and maintain since the prior art stem tube seal did not feature a split design.

SUMMARY OF THE INVENTION

Featured is a seal system for a shaft such as a stern tube shaft. A face seal stator ring is disposable about the shaft and a face seal rotor ring is disposable about the shaft for rotation therewith. One of the stator ring and rotor ring includes a wide sealing face made of a metal and the other of the stator ring and rotor ring including a narrower plastic sealing face confronting the wider face. Preferably, it is the stator ring which includes the narrower confronting plastic sealing face (made of, for example, polyamide-imide). In the preferred version, the stator ring confronting sealing face tapers to narrower widths rearwardly to reduce the confronting area of the stator sealing face as the stator sealing face wears.

The stator ring may further include a rearward flange for mounting the stator ring to a stator holder. The rotor ring wider sealing face may include a second material. For example, the wide sealing face may include a tungsten carbide coating on the metal rotor ring. The seal system may further include a clamp ring fixed to the shaft and to the rotor. The system may further include a fluid activated back-up seal. The fluid activated back-up seal preferably includes a lip seal spaced from the rotor and a foam body including a gel material configured to expand in the presence of fluid and disposed to urge the lip seal into engagement with the rotor to seal the rotor in the presence of fluid. One or more inflatable seals may also be provided. The inflatable seals are used as emergency backup seals outboard of the main seal so they can be inflated to allow maintenance to be performed on the main seal. Having two inflatable seals provides two levels of protection. In ships with only one inflatable seal, a second layer of protection is effected by having divers install a cofferdam on the ship underwater which is a costly and time consuming procedure.

The seal system may further include a spring assembly about the shaft biasing the confronting sealing faces into engagement with each other. Preferably, the spring assembly includes a plurality of spaced metal members on a seal member. The seal member conforms to the shape of the spaced metal members. Preferably, the spaced metal members and the seal member are bent towards the shaft at each edge and then bent away from the shaft and outwardly between the edges. All these bends are radiused.

Also featured is a seal system comprising a face seal stator ring disposable about the shaft and sealable with respect to the hull, and a face seal rotor ring disposable about the shaft and including a wide sealing face made of tungsten carbide. The stator ring includes a narrower sealing face confronting the rotor ring wider sealing face, and the stator ring sealing face is made of polyamide-imide and tapers to narrower widths rearwardly.

Also featured is a method of sealing a shaft. The preferred method includes configuring one of a face seal stator ring and rotor ring to include a first sealing face made of a metal and configuring the other of the face seal stator ring and rotor ring to include a second sealing face made of a plastic material confronting the first sealing face. The second sealing face is made narrower than the first sealing face and the second sealing face is manufactured so it tapers to narrower widths rearwardly.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
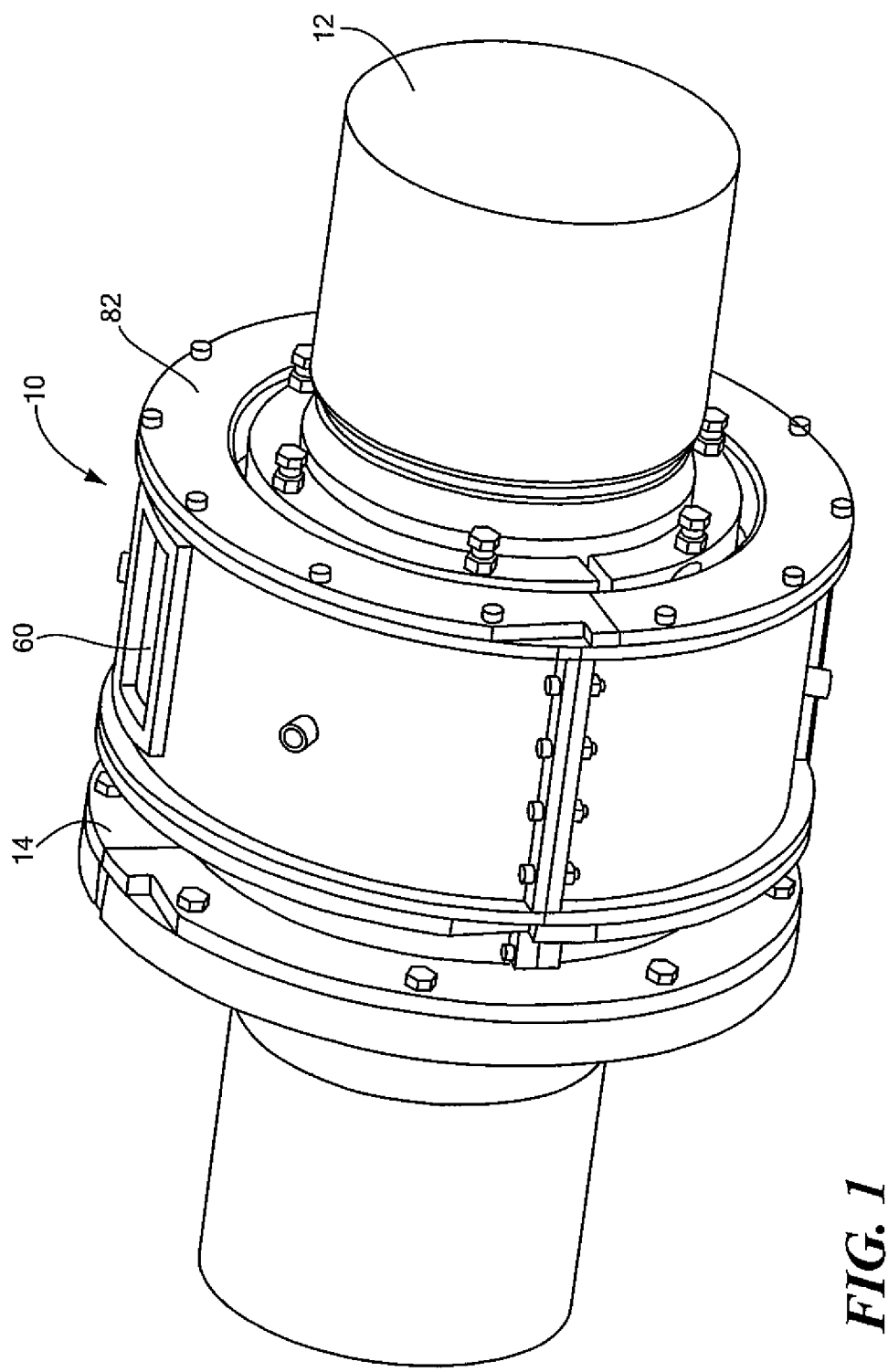
FIG. 1 is a schematic three dimensional front view showing an embodiment of a new stem tube seal system.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
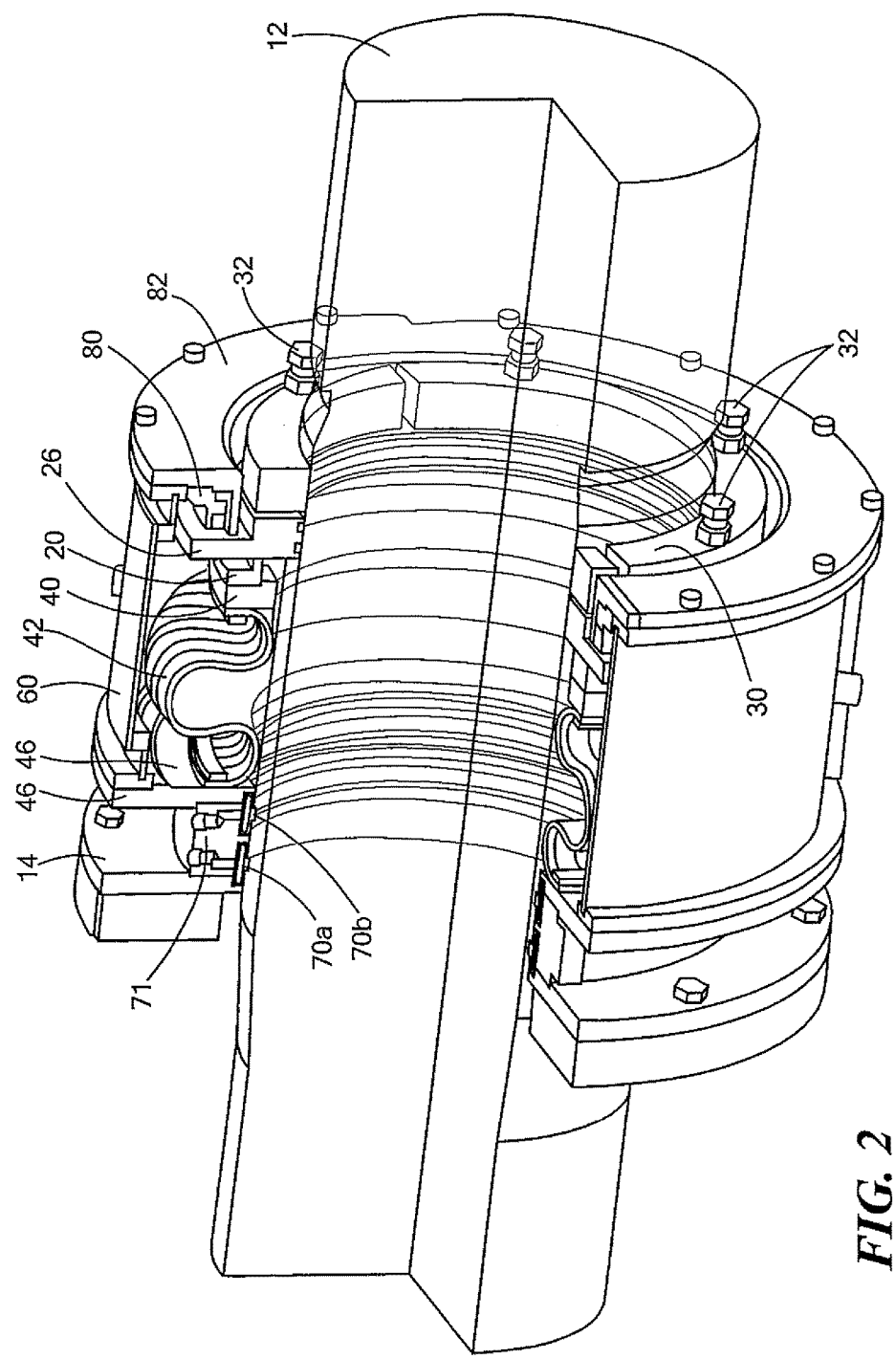
FIG. 2 is a schematic three dimensional partially cutaway view of the seal system of FIG. 1.
Figure 3:
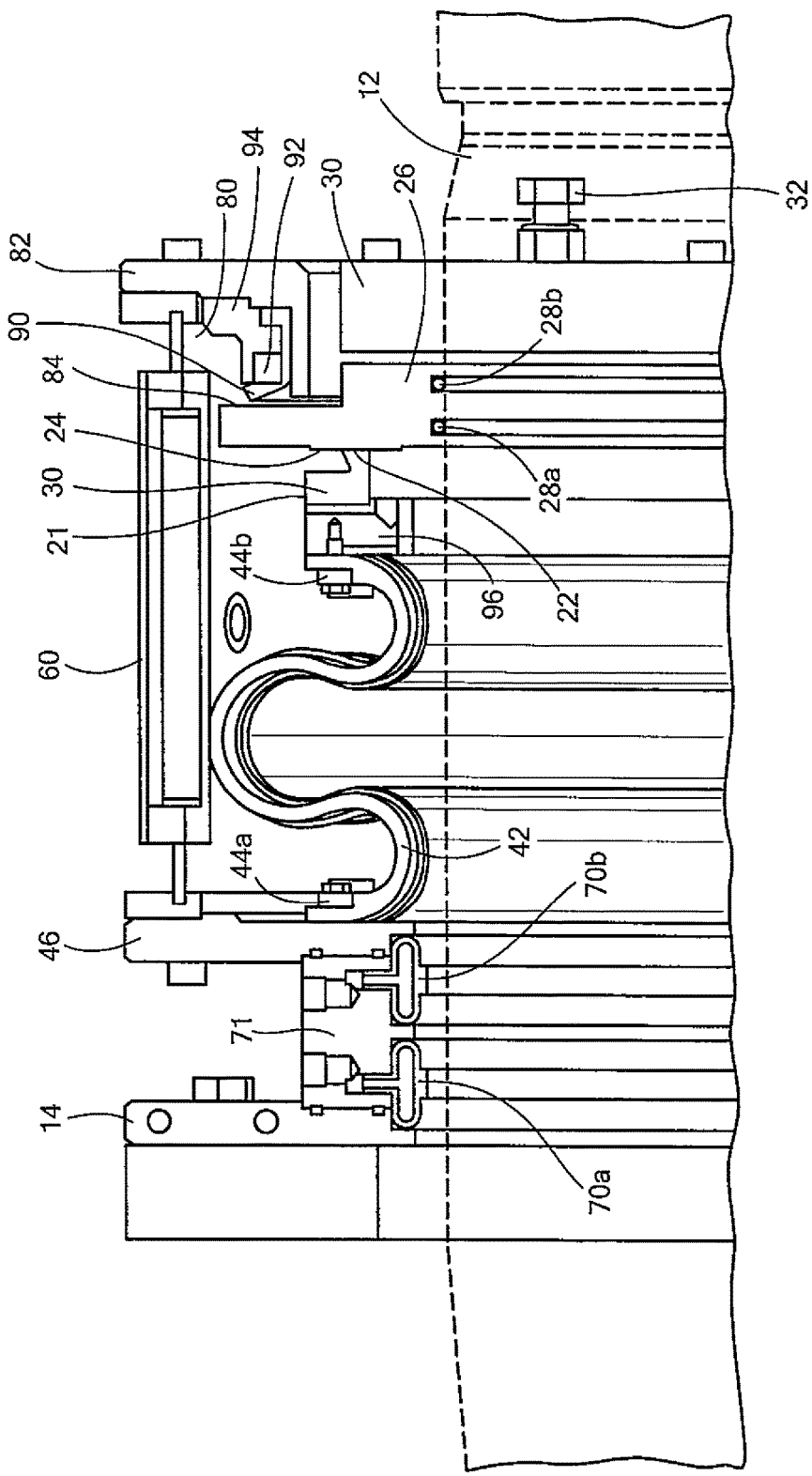
FIG. 3 is a schematic cross section view showing the top section of the seal system of FIGS. 1-2.
Figure 4:
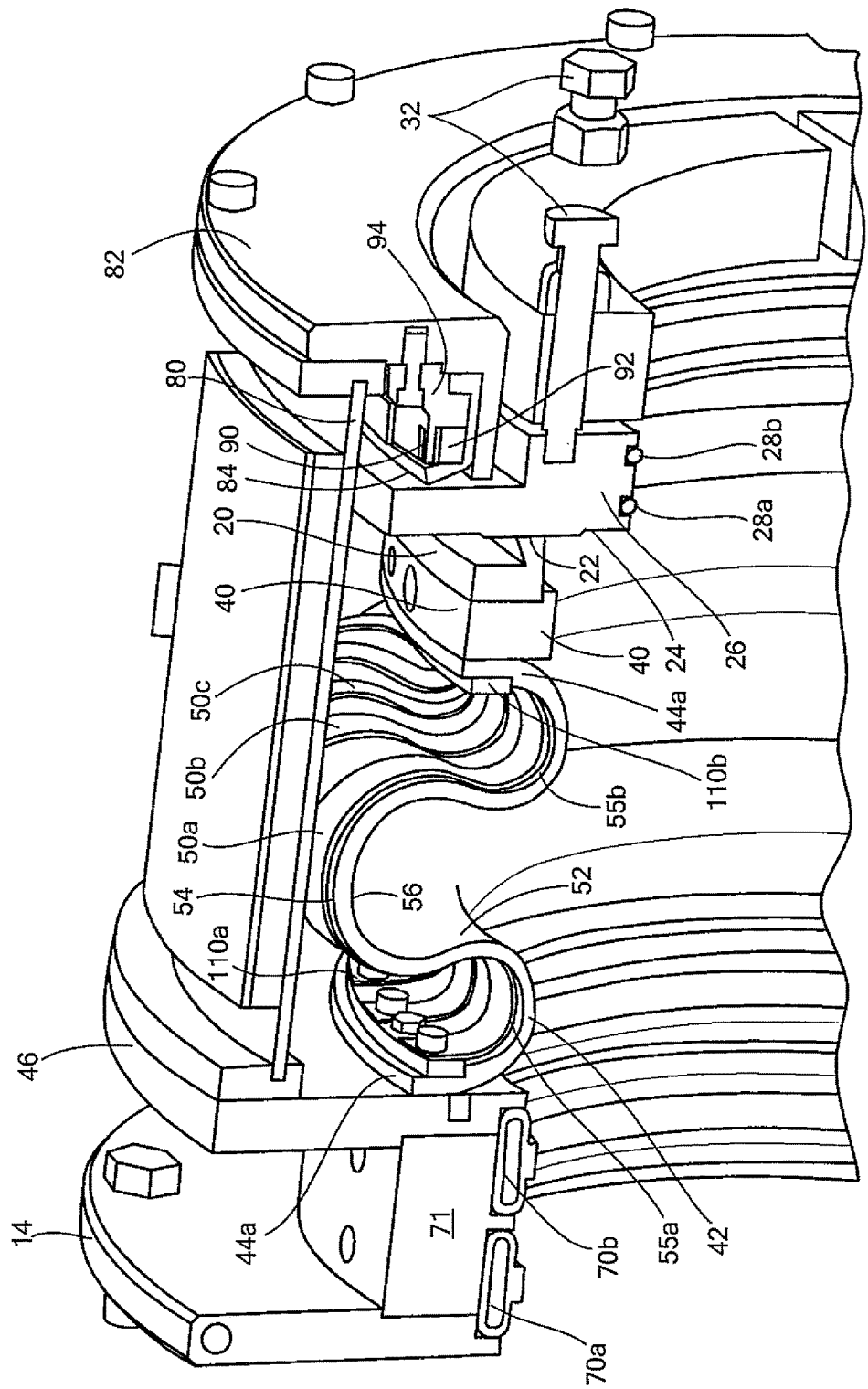
FIG. 4 is a schematic three dimensional cross sectional exploded view showing the primary components associated with a preferred stern tube seal system.

FIG. 1 shows a new split design system 10 here disposed about rotating stern tube shaft 12 sealing it with respect to structure 14 to be coupled to a ship's mounting flange. All of the components of the stern tube seal system preferably include a spilt design where two halves of the structure, for example, are coupled together about the shaft for easier installation and/or maintenance. As shown in FIGS. 2-4, plastic, for example, polyamide-imide (e.g., Torlon™) stator ring 20 is disposed about shaft 12, is stationary, and includes face 22 confronting wider raised metal face 24 coated, for example, with tungsten carbide, of metal rotor ring 26 also disposed about shaft 12 and coupled thereto and sealed with respect to the shaft via O-rings 28a, 28b. In this particular example, clamp ring 30 in two halves is clamped to shaft 12 and rotor 26 is coupled to clamp ring 30 via fasteners 32.

Stator 20 is set in holder ring 40 and is urged into a confronting relationship with rotor 26 via spring assembly 42 disposed about shaft 12 with one side ring 44a abutting and fastened to wall 46 and opposing side ring 44b abutting and fastened to holder ring 40. Stator carrier 40 may include flushing ports as shown at 96, FIG. 3 typically connected to a source of filtered sea water.

In this preferred example, spring assembly 42 includes spaced bent metal (e.g., stainless steel) members 50a, 50b, 50c, and the like on rubber seal member 52 bent as shown to conform to the shape of the spaced metal members. Thus, both the metal members and the seal member bend downwardly towards the shaft and inwardly from side rings 44a and 44b and then upwardly away from the shaft and outwardly to reach apex 54. The downward bends 55a and 55b and the upward bend 56 are radiused as shown. The result is a structure which biases stator 20 into engagement with rotor 26 and, at the same time, seals the shaft 12 between holder ring 40 and wall 46 and prevents ocean water beneath the metal/rubber hybrid spring structure from entering the area above the spring within access panel 60.

Dual inflatable backup seals 70a and 70b set in ring 71 may also be provided between wall 46 and wall 14 and can be inflated in an emergency situation. A fluid activated back up seal may also be provided to seal split ring 82 to rotor 26 rear face 84. Lip seal 90 is normally spaced from rotor 26. Foam body 92 includes a gel material configured to expand in the presences of water to urge lip seal into engagement with rotor 26. Carrier ring 94 is provided to house lip seal 90 and gel material 92. See U.S. Pat. Nos. 7,828,299 and 7,686,308 incorporated herein by this reference.

The result in one preferred embodiment is a split design stern tube seal for easier installation and maintenance, a stern tube seal which uses corrosion-resistant materials, a stern tube seal which uses non-brittle materials for shock survival, and a rotor and stator design which allows for maximum shaft deflection. Emergency backup sealing subsystems are provided to allow for continued operations. The service window is provided to monitor the seals performance and/or to service one or more of the various seal components.

To accommodate deflections of shaft 12, one of the confronting faces of the stator/rotor pair is preferably much wider than the other confronting face. In the example shown, wider raised face 24 of harder material rotor 26 confronts narrower softer material face 22 of stator 20. Raised rotor face 24 may be coated with tungsten carbide or the whole rotor may be made of tungsten carbide. The particular combination of the plastic stator and tungsten carbide rotor confronting face seals results in a low friction, low wear, and long life face seal. In other versions, the rotor may include the plastic face seal and the stator includes the wider metal face seal.

Previous face seals included two silicon carbide confronting faces which resulted in a fragile face seal material. The tungsten carbide material used in the new design was particularly chosen because it is extremely dense, has a high compressive strength, and a high tensile strength. In one example, the tungsten carbide material had an elastic modulus of 640 GPa, a Poissan's ratio of 0.21, a shear modulus of 263 GPa, a density of 15,600 kg/m$^3$, a compressive strength of 5090 MPa, a tensile strength of 450 MPa, a thermal expansion coefficient of 5.8 (μm-m-c), a specific heat of 238 (J/kg-k), a maximum recommended temperature of 752° C., a fracture toughness of 7 (MPa-m$^{-5}$), and a knoop hardness of 1500. Different binders can also be used to alter the characteristics of the tungsten carbide confronting face and preferably only the raised face portion 24 of the rotor includes tungsten carbide material thermally spray coated on a duplex stainless steel rotor substrate to avoid significant weight increase and to reduce material costs.

The plastic sacrificial face seal mating material was chosen for its high strength and stiffness and its resistance to wear, creep, and chemicals. Torlon™, in particular, is injection moldable and wear resistant and formulated to give good wear resistance in lubricated applications. Based on testing, the combination of the Torlon™ stator and the tungsten carbide coated rotor results in a Torlon™ stator expected to last greater than three years assuming a face seal thickness of 10 mm.

This face seal design was tested for over 200 hours using Navy supplied operational speed profiles and pressures. The face seal was able to maintain a leak rate well within the leak requirements of American Bureau of Shipping Navy Vessel Rules (ABS NVR), Part 2, Chapter 4, Section 5. The seal far exceeded the requirement of <158 mL/minute (<2.5 gallons/hour) of dynamic leakage. The requirement is for after 300 hours of dynamic break-in, while the seal described here met the requirement throughout the initial 200 hours of testing.

Figure 5A:
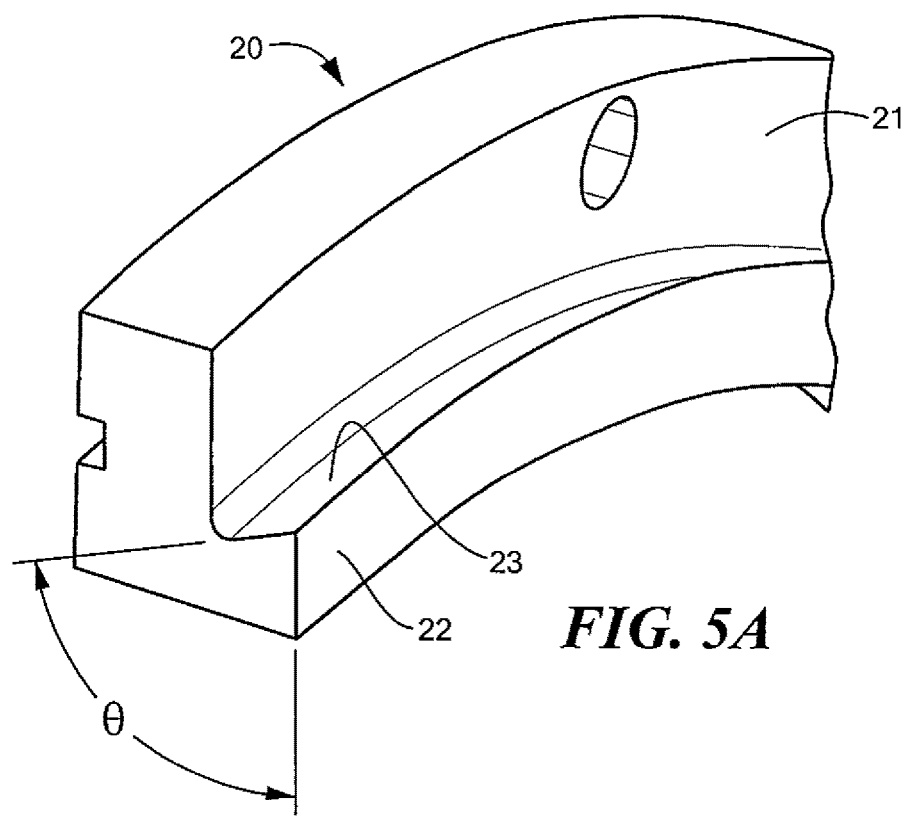
FIG. 5A is a schematic cross section view of a preferred stator ring for the stem tube seal of FIGS. 1-4.
Figure 5B:
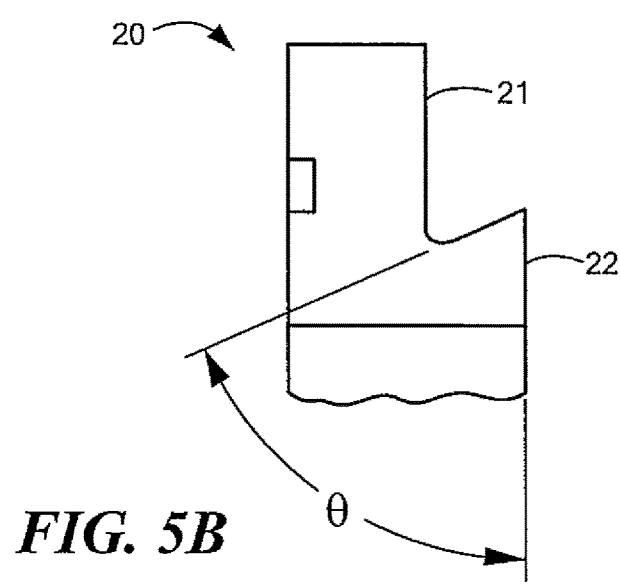
FIG. 5B is a schematic cross sectional view of the preferred stator ring shown in FIG. 5A.

Preferably, stator ring 20 confronting face 22, FIGS. 5a-5b tapers to narrower widths rearwardly towards flange 21 to reduce the confronting area of the stator face as the stator wears. Since the confronting face area is reduced as the stator wears, the strength force provided by spring assembly 42, FIG. 3 remains constant or nearly constant and thus the pressure exerted by the stator face seal on the rotor face seal remains constant or nearly constant over time. Angle θ is thus less than 90°, preferably below 60° and 70°. The preferred stator ring has, as shown, an "L" cross section with flange 21 for mating to a stator holder and wall 23 between flange 21 and sealing face 22.

The performance of a face seal is dependent upon the face pressure between the two faces of the seal. Too low of a pressure and the faces will not make an adequate seal. Too high of a pressure will result in an increase of friction between the faces and therefore accelerated wear. There is an optimal face seal pressure based on what is called the duty parameter, a non-dimensional number which takes into account face pressure, surface speed and some material properties. The lifetime of a face seal is dependent upon the wear of the face seal materials. The optimal face seal will find the best face pressure to meet both leak and wear requirements.

The face pressure of the face seal is determined by the spring force behind the face and the internal fluid effects. The fluid effects on the face pressure are a result of the balance ratio of the face seal, which is the ratio between the closing and opening areas exposed to the fluid. Depending on the ratio, the fluid will have varying magnitude of impact on the face pressure.

As a face seal wears, the spring force behind the face seal provided by spring assembly 42, FIG. 3 relaxes, decreasing the face pressure and increasing leak age. To counteract this, the outside diameter of the stator ring is angled to reduce the face 22 area as it wears. The angle chosen (Θ) will result in constant face pressure, since as the spring load reduces the face area will also decrease.

The one issue with reducing the face area is that it directly impacts the balance ratio. Reducing the face area increases the balance ratio, increasing the fluid pressure impact on the overall face seal pressure. The angle can be further adjusted so that both the reduced spring load and increasing balance ratio can be perfectly offset to result in constant face pressure as the face seal wears. In FIG. 5b, Θ is 65.490 and R is 0.079.

Figure 6:
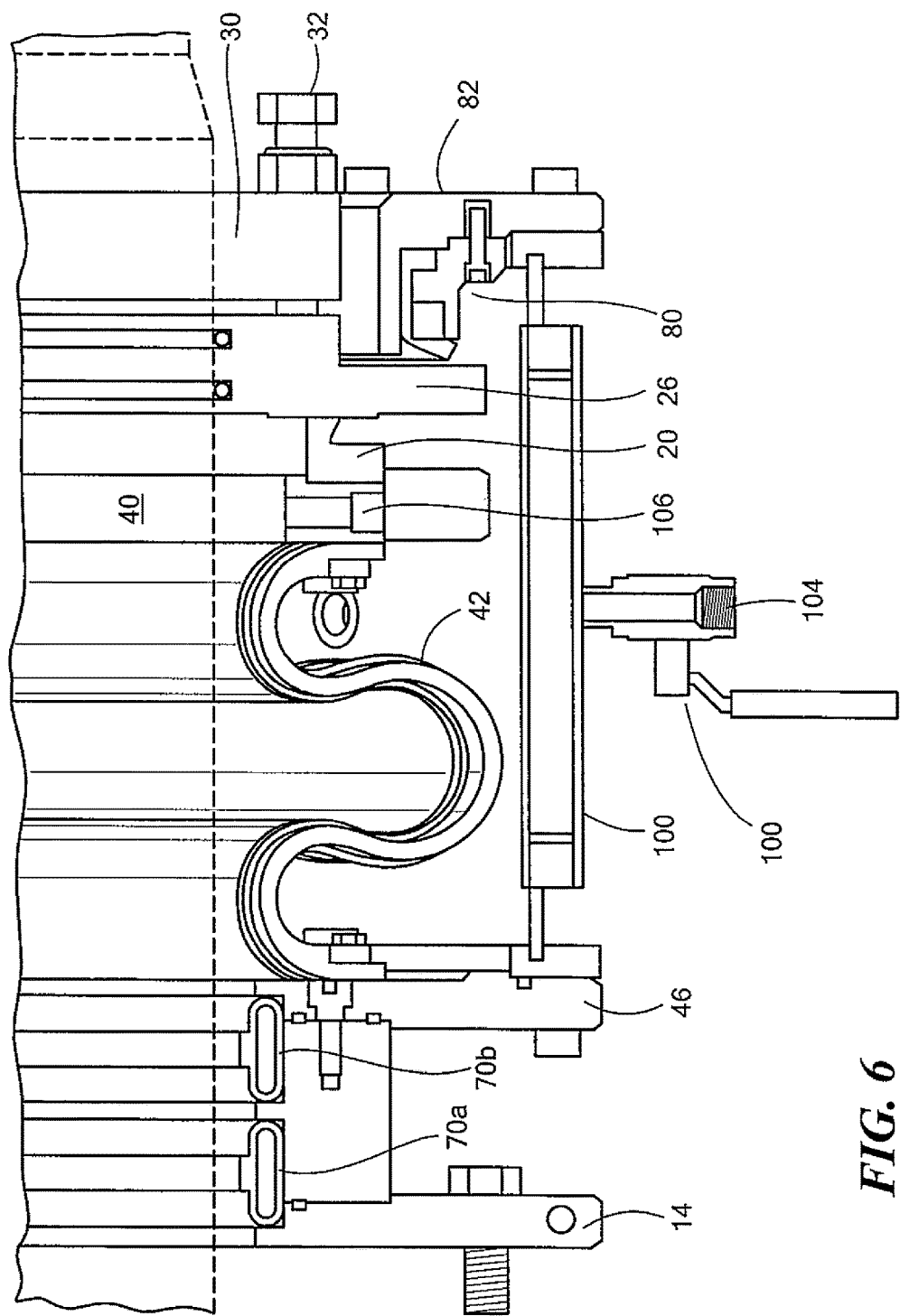
FIG. 6 is a schematic cross sectional view showing the bottom of the stem tube seal system.

FIG. 6 shows bottom housing viewing access panel 100 with valve 102 for drain 104. FIG. 6 also shows drain plug 106 in holder 40.

Figure 7:
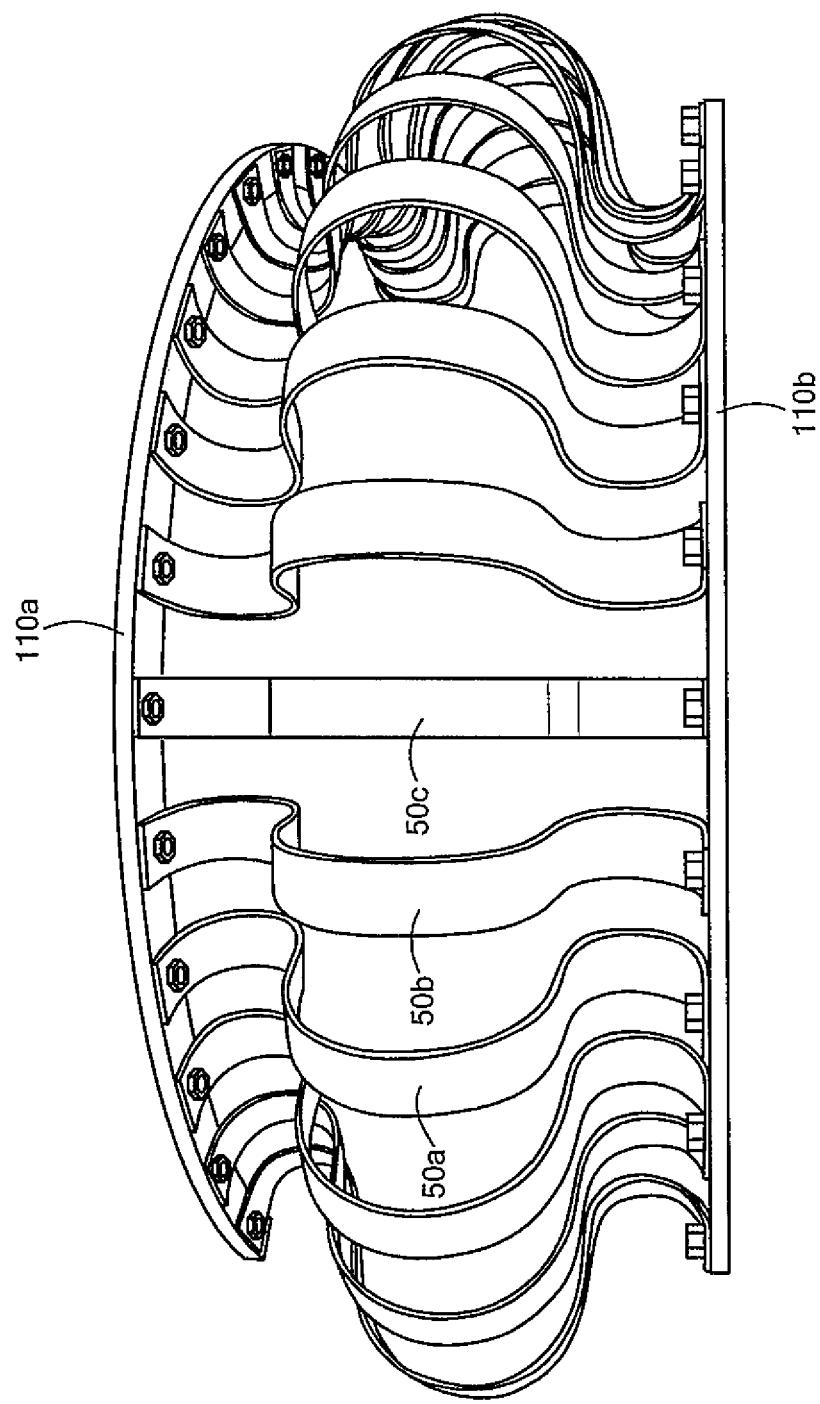
FIG. 7 is a schematic view showing the steel spring elements of the spring assembly associated with the stem tube seal.
Figure 8:
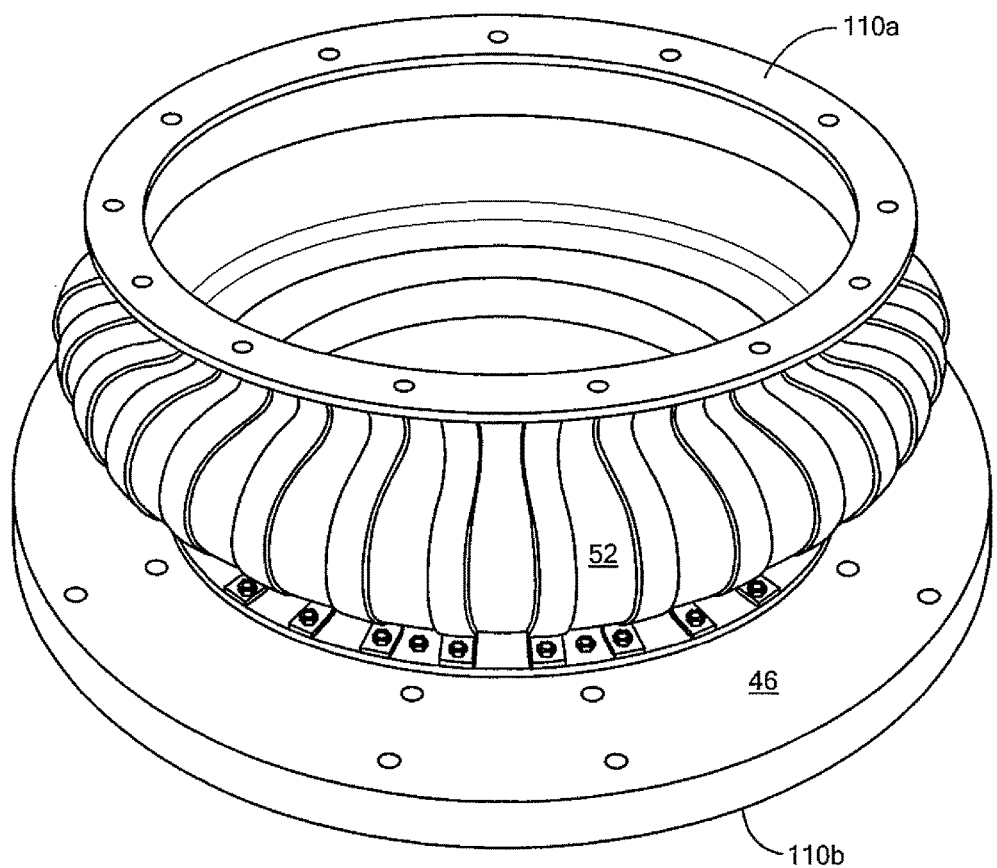
FIG. 8 is a schematic three dimensional view showing a complete spring assembly.

FIGS. 7-8 show bent stainless steel spring elements, 50a, 50b, 50c, and the like extending between and coupled on each end to rings 110a, 110b which can be fastened to ring 46 and stator cover ring 40, FIG. 4, respectively. Rubber seal 52 is preferably a high strength 80A black HNVR rubber element.

Figure 9:
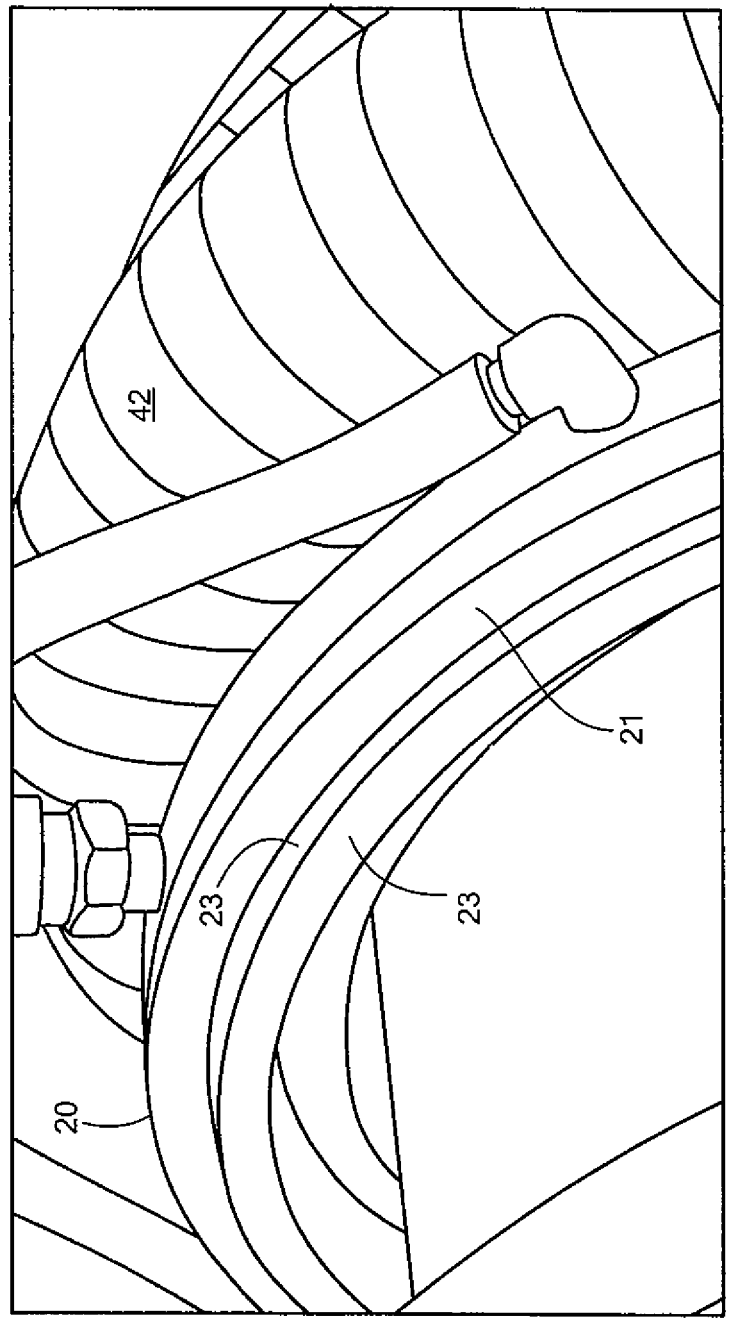
FIG. 9 is a schematic view showing the stern tube seal stator ring.
Figure 10:
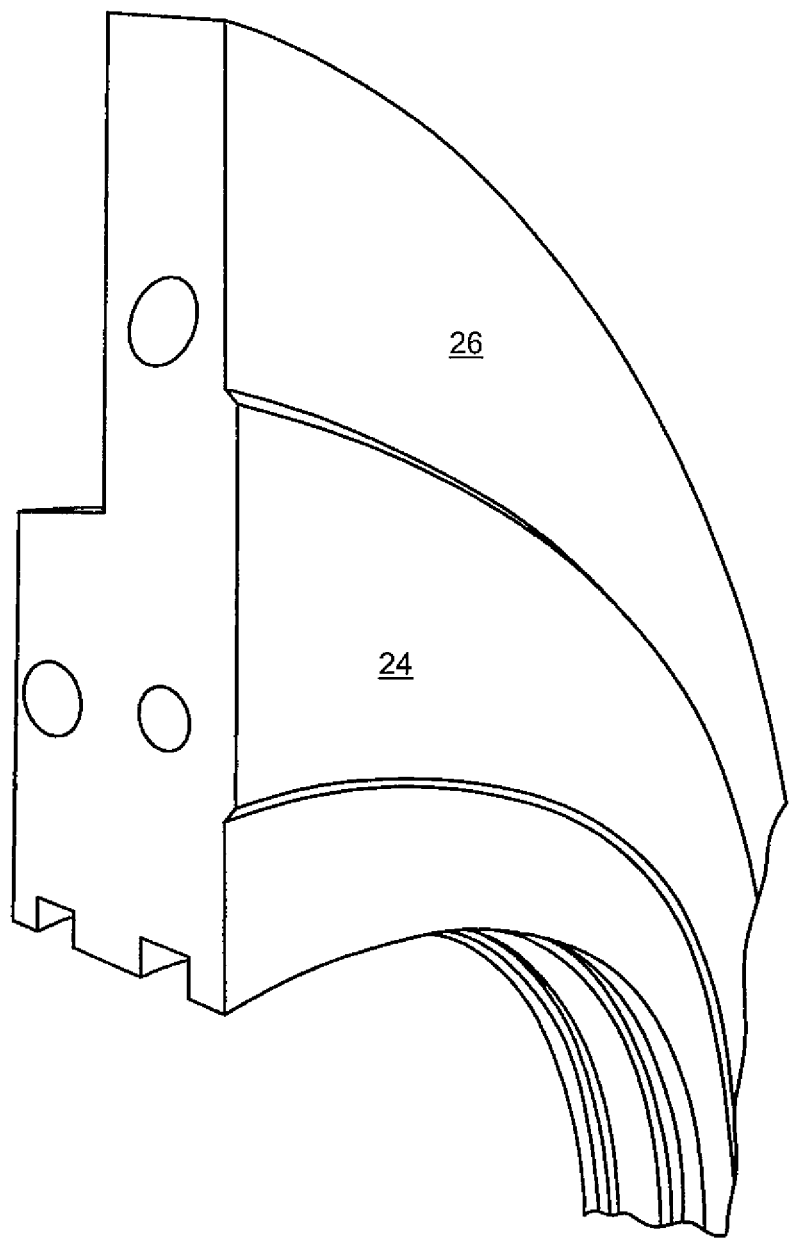
FIG. 10 is another schematic three dimensional view showing the stator ring mounted to the stator holder ring.
Figure 11:
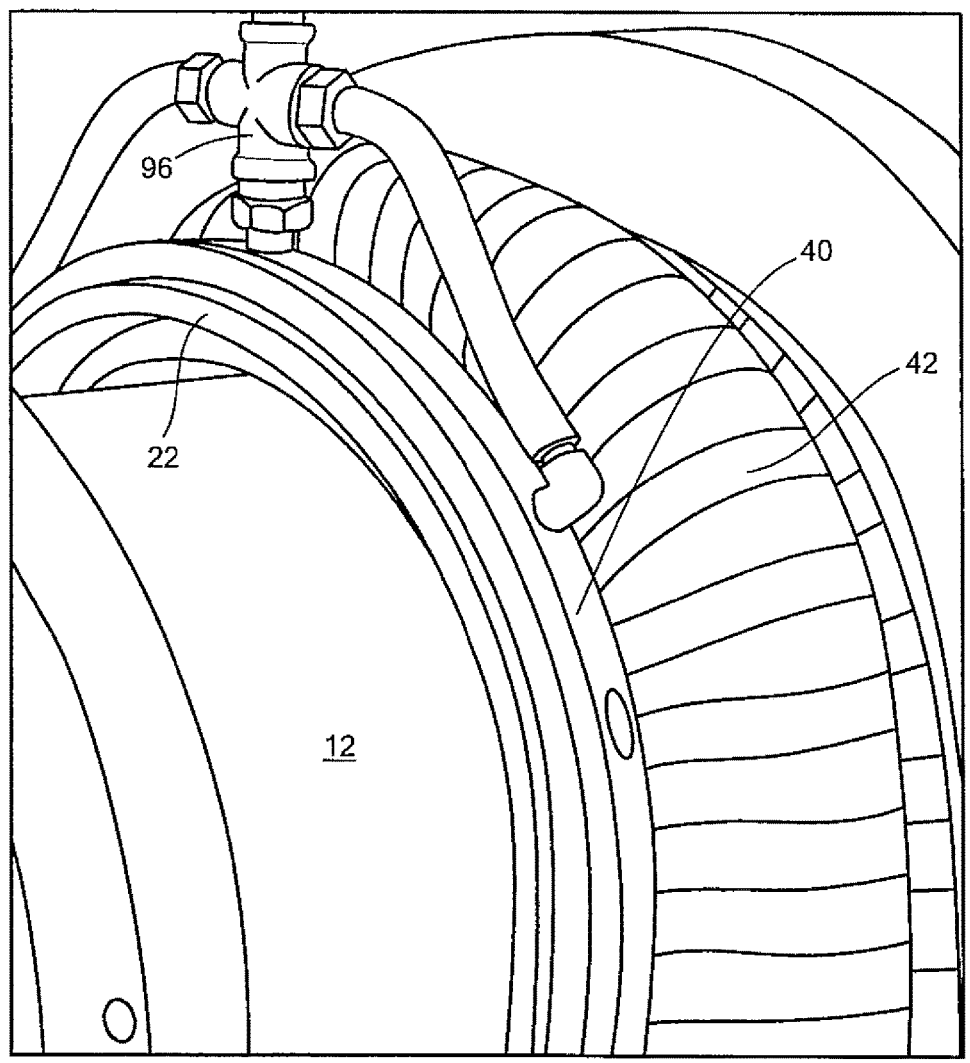
FIG. 11 is a schematic view showing the rotor ring for the stern tube seal system.

FIGS. 9 and 11 show stator 20 with flange 21 fastened to carrier ring 40 and flushing ports 96a, 96b, and 96c. FIG. 10 shows duplex steel rotor 26 with raised wide tungsten carbide coated confronting face 24.

Rotor sealing face 24 may be hard and wide while the stator sealing face 22 FIG. 9 may be softer and narrower. If the harder sealing face was narrower than the softer sealing face, the harder sealing face would wear a groove in the softer sealing face. If both sealing faces were approximately the same width, shaft deflections would result in damage to the seal faces and excessive leakage.

So, it is preferred that the relatively hard tungsten carbide rotor sealing face be much wider than the relatively softer plastic sealing face to accommodate shaft deflections and to prevent grooves in either sealing face. In one example, sealing face 22, FIG. 9 of the stator was 12 mm wide and sealing face 24, FIG. 11 of the rotor was 40 mm wide.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A stern tube seal system comprising:
   a split housing disposable about a propeller shaft;
   a split face seal stator ring assembly in the housing disposed about the propeller shaft;
   a split face seal rotor ring assembly in the housing coupled and sealed to the propeller shaft;
   one of the stator ring assembly and the rotor ring assembly including:
      a wide sealing face made of a metal, and
      the other of the stator ring assembly and the rotor ring assembly including a narrower sacrificial plastic sealing face confronting the wider sealing face;
   the sacrificial plastic sealing face tapering to narrower widths rearwardly to reduce the confronting area of the sacrificial plastic sealing face as the sacrificial plastic sealing face wears; and
   a spring assembly in the housing biasing the stator ring assembly into engagement with the rotor ring assembly, the spring assembly including:
      spaced bent metal members disposed about the shaft extending between the housing and the stator ring assembly, and
      a rubber seal member about the shaft conforming to the spaced bent metal members sealing the stator ring assembly with respect to the housing.

2. The system of claim 1 in which the sacrificial plastic sealing face tapers at an angle sufficient to maintain a constant or nearly constant strength force applied by the spring assembly as the sacrificial plastic sealing face wears.

3. The system of claim 2 in which said angle is between 60 and 70 degrees.

4. The system of claim 1 in which the wide sealing face includes a second material on the metal ring.

5. The system of claim 4 in which the wide sealing face includes a tungsten carbide coating on the metal ring.

6. The system of claim 1 in which the plastic is polyamide-imide.

7. The system of claim 1 in which the rotor assembly include a clamp ring fixed to the shaft and to the rotor ring.

8. The system of claim 1 further including a fluid activated back-up seal.

9. The system of claim 1 in which the stator ring assembly includes a stator holding ring fixed to the stator ring and the spring assembly.

* * * * *